C. O. ROE.
MACHINE FOR COOKING SHELLED PEANUTS, &c.
APPLICATION FILED JUNE 8, 1908.
940,557.
Patented Nov. 16, 1909.
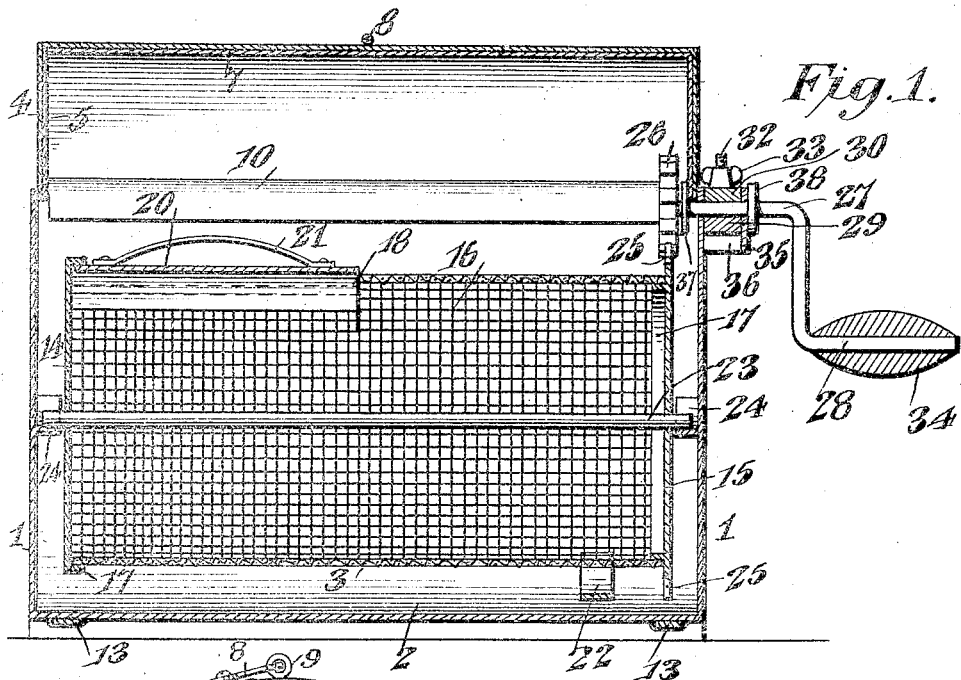
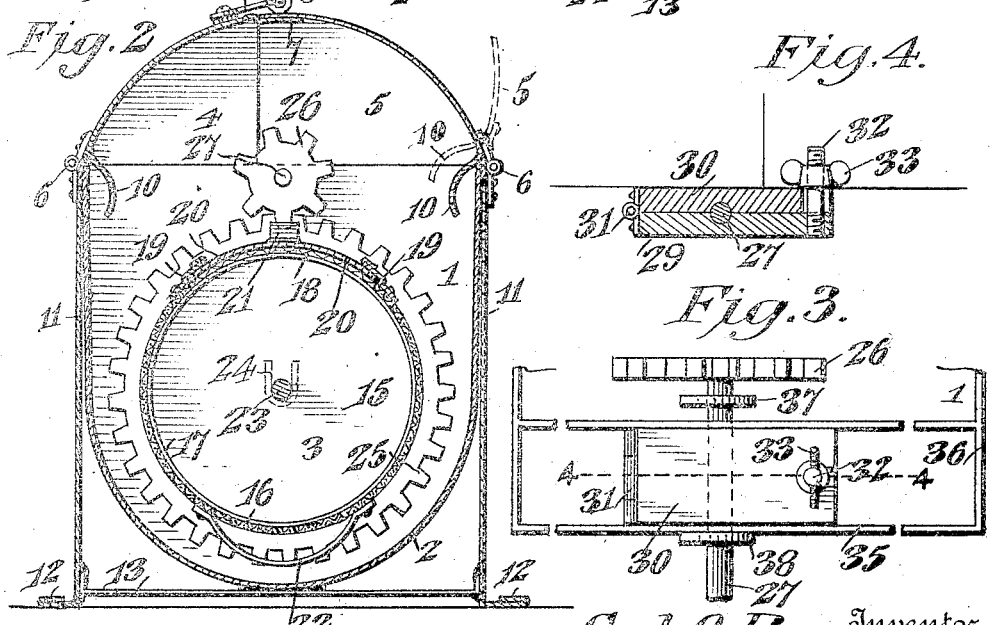
Carl O. Roe, Inventor

UNITED STATES PATENT OFFICE.

CARL O. ROE, OF WESLEY, IOWA.

MACHINE FOR COOKING SHELLED PEANUTS, &c.

940,557.  Specification of Letters Patent.  Patented Nov. 16, 1909.

Application filed June 8, 1908. Serial No. 437,356.

*To all whom it may concern:*

Be it known that I, CARL O. ROE, a citizen of the United States, residing at Wesley, in the county of Kossuth and State of Iowa, have invented a new and useful Machine for Cooking Shelled Peanuts, &c., of which the following is a specification.

The invention relates to a machine for cooking shelled peanuts, etc.

The object of the present invention is to provide a simple and inexpensive machine, designed for cooking and similarly treating nuts in preparing salted peanuts, blanched almonds, etc., and adapted to rapidly cook shelled peanuts in hot grease or analogous liquid without stirring the contents of the device.

A further object of the invention is to provide a device of this character adapted to enable such cooking to be performed with a minimum amount of grease, so that when the liquid rapidly becomes bitter and dirty and has to be thrown away, the loss will be as small as possible.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a longitudinal sectional view of a machine, constructed in accordance with this invention. Fig. 2 is a transverse sectional view. Fig. 3 is a detail plan view of one end of the machine, illustrating the construction for detachably mounting the operating shaft. Fig. 4 is a detail sectional view on the line 4—4 of Fig. 3.

Like numerals of reference designate corresponding parts in all the figures of the drawing.

1 designates a casing, constructed of sheet metal, or other suitable material and composed of sides and ends and having a rounded bottom portion 2, arranged concentric with an inner rotary cylindrical receptacle 3, so as to reduce to a minimum the quantity of liquid necessary for cooking the peanuts or other material. The casing, which is oblong in plan view, is provided at the top with covers 4 and 5, forming an approximately semi-cylindrical top and connected at their outer edges with the body portion of the casing by hinges 6. Each of the covers is curved and is provided with approximately quadrant-shaped end pieces, and the cover 4 has a longitudinal flange 7 at its inner or upper edge. The longitudinal flange extends beneath the upper edge of the other cover 5 and closes the joint between the two covers, which are locked in their closed position by means of a hook 8 and an eye 9. The hinged covers are also equipped at their lower or hinged edges with inner longitudinal guards 10, consisting of curved flanges formed integral with the covers and extending inwardly and downwardly, when the covers are closed, and adapted to extend over and cover the hinged joints between the covers and the sides of the casing, when the former are open. These guards, which extend longitudinally of the covers, are adapted to conduct the drip back into the machine, when the cylindrical receptacle is taken out of the casing to remove its contents.

The casing is supported by vertical sides 11, constructed of sheet metal and secured at their upper edges to the upper portions of the sides of the casing and extending downward to the supporting surface and having horizontal flanges 12, formed by bending their lower edges or portions outwardly, as clearly illustrated in Fig. 2 of the drawing to provide feet. The lower portions of the vertical sides are connected by bottom cross pieces 13, secured at their terminals to the inner faces of the sides 11 and connected at an intermediate point to the bottom of the casing. The terminals of the bottom cross pieces are bent upward and are preferably soldered to the sides 11, and the central portions of the bottom cross pieces are similarly fastened to the casing, but any other suitable means may be employed for securing the bottom cross pieces to the casing and to the sides, as will be readily understood. The sides forming supports for the casing operate to confine the heat at the bottom of the casing. The spaces between the bottom of the casing and the vertical sides are open at the ends of the machine.

The inner rotary receptacle preferably consists of sheet metal heads 14 and 15 and a woven wire body portion 16, secured to inwardly extending annular flanges 17 of the said heads. The interstitial apertures of the woven wire permit the grease to pass readily through the inner receptacle, and they enable the contents of the inner receptacle to be thoroughly subjected to the cooking action of the hot grease contained within the casing, but the body portion of the inner receptacle may be constructed in any other desired manner to provide the necessary openings for the passage of the grease. The body portion of the receptacle is provided with an opening 18, and it has opposite guides 19 located at the sides of the opening and receiving a slide 20, equipped with a handle 21 and adapted to be moved longitudinally of the inner receptacle to afford access to the contents of the same and also to cover the opening 18. The inner receptacle is also provided with a handle 22, located adjacent to one end of the inner receptacle and adapted to facilitate the removal of the inner receptacle from the machine.

The heads 14 and 15 of the inner receptacle are secured to a shaft 23, having projecting terminal gudgeons or journals detachably arranged in open bearings 24 of the end walls of the casing. The inner receptacle is also equipped at one end with a gear 25, preferably formed integral with the head 15 and meshing with a pinion 26 of an operating shaft 27. The operating shaft 27, which is provided with an outer crank 28, is detachably journaled in a sectional bearing 29 having a hinged upper section 30, adapted to open to permit the removal of the shaft preparatory to taking the cylinder out of the casing. The upper section 30 of the bearing 29 is connected at one end with the lower section or portion of the bearing by means of a hinge 31, and the other end is slotted to receive a screw 32, extending upward from the lower section and provided with a thumb nut 33, which clamps the upper hinged section 30 in its closed position. The crank 28 is preferably provided with a handle 34 of wood, or other suitable material, and when the shaft is rotated motion is communicated to the cylinder through the gearing, the rotary movement of the inner receptacle obviating the necessity of stirring its contents and also serving to thoroughly and uniformly subject its contents to the action of the liquid employed in treating or otherwise cooking the material. In practice lard, butter, cocoanut oil, or other cooking oil will be employed for cooking shelled peanuts in the preparation of salted peanuts, but the machine may be employed for a variety of analogous uses, and hot water may be employed for soaking almonds to remove the skins thereof.

The sectional bearing, which is located exteriorly of the casing, is supported by a horizontal brace 35, extending transversely of the machine in spaced relation with the end of the same and having terminal portions 36, suitably secured to the adjacent end wall of the casing. The operating shaft 27 is provided with inner and outer annular collars or flanges 37 and 38 to prevent longitudinal movement of the operating shaft for retaining the pinion in mesh with the gear of the inner rotary receptacle.

The liquid contents of the machine is heated over a gasolene or other heater, and the hot grease operates to quickly roast or fry the shelled peanuts.

Having thus fully described my invention, what I claim as new and desire to secure by Letters Patent, is:—

1. A machine of the class described including a casing, an inner removable receptacle, and a cover hinged to the casing and provided at its hinged edge with a continuous longitudinally disposed transversely curved flange or guard spaced from and spanning the hinge joint of the cover and extending downwardly and inwardly into the receptacle beyond the hinge joint when the cover is open, so as to direct the drip back into the machine when the inner receptacle is removed therefrom.

2. A machine of the class described including a casing, an inner removable receptacle, covers hinged to the casing at opposite sides thereof and provided at their hinged edges with inwardly extending longitudinal guards or flanges formed integral with the covers and curved transversely and spanning the hinge joints of the covers, said guards or flanges extending downward into the casing when the covers are open so as to direct the drip back into the machine when the inner receptacle is removed.

3. A machine of the class described including a casing provided with inner open bearings, an inner rotary receptacle provided at its ends with journals arranged in the said bearings, said receptacle being also provided with a gear, a sectional bearing mounted on the casing and having a hinged section or member, a shaft journaled in the sectional bearing and provided with a pinion meshing with the gear of the inner receptacle, and fastening means for securing the hinged section of the bearing.

In testimony, that I claim the foregoing as my own, I have hereto affixed my signature in the presence of two witnesses.

CARL O. ROE.

Witnesses:
LOUIS H. RASMUSON,
GEORGE B. HALL.